Nov. 15, 1966 E. R. ANDREGG ETAL 3,286,040

CALL TRANSMITTER EMPLOYING A CODE BEARING MEDIUM

Filed Oct. 31, 1963 5 Sheets-Sheet 1

INVENTORS: E. R. ANDREGG
H. J. HERSHEY
C. W. McGEE

BY Harry L. Newman
ATTORNEY

Nov. 15, 1966 E. R. ANDREGG ETAL 3,286,040

CALL TRANSMITTER EMPLOYING A CODE BEARING MEDIUM

Filed Oct. 31, 1963 5 Sheets-Sheet 2

CALL TRANSMITTER EMPLOYING A CODE BEARING MEDIUM 3,286,040

CALL TRANSMITTER EMPLOYING A CODE BEARING MEDIUM

Ernest R. Andregg, Harold J. Hershey, and Chester W. McGee, Indianapolis, Ind., assignors to Bell Telephone Laboratories, Incorporated, New York, N.Y., a corporation of New York Filed Oct. 31, 1963, Ser. No. 320,299
11 Claims. (Cl. 179—90)

This invention pertains to call transmitters and particularly to automatic call transmitters that employ a code bearing member having a plurality of digits encoded thereon.

Although not limited thereto the present invention is directed toward call transmitters of the type disclosed in the copending application of E. R. Andregg-W. Pferd-R. R. Stokes, Serial No. 193,267, filed on May 8, 1962 and issued on June 15, 1965 as Patent No. 3,189,692. Call transmitters of this type include a plurality of switches that are actuated responsive to the coding on a code bearing member. The code bearing member is periodically advanced relative to the code switches, and each advancement of the code bearing member presents the coding representing a single digit and results in the actuation of individual ones of the code switches.

In addition to the plurality of code switches, the call transmitter includes a plurality of switches that are actuated in a particular sequence, the sequence of actuation being repeated for each advancement of the code bearing member. The plurality of code switches and the plurality of sequence switches are included in a switching matrix and when the actuated sequence switches match the actuated code switches, a path is provided through the switching matrix. Means are provided for transmitting signals out on a telephone line under the control of the switching matrix, and the provision of a path through the switching matrix is determinative of whether signals are or are not transmitted.

An object of this invention is to simplify call transmitters of this type.

This and other objects of this invention are achieved in an illustrative embodiment thereof within the call transmitter comprises a plurality of members for sensing the coding on the code bearing member and a plurality of switches respectively associated with the sensing members, each switch biasing its associated sensing member toward the code bearing member. Means are provided for maintaining the sensing members spaced from the code bearing member and permitting the sensing members to move toward the code bearing member in a particular sensing sequence. Each sensing member is moved to a first position when no coding is detected thereby and moved to a second position when coding is detected thereby, and the switch with which each sensing member is associated is actuated only upon the movement of the sensing member to the second position. The plurality of switches are included in a switching matrix, and the actuation of a switch at a particular point in the sensing sequence provides a path through the matrix that once provided is maintained throughout the remainder of the sensing sequence. A signal generating means operates in conjunction with the switching matrix and transmits pulses out on a telephone line when no path is provided through the switching matrix.

A complete understanding of the invention and these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

*General description*

Figures 1, 2:
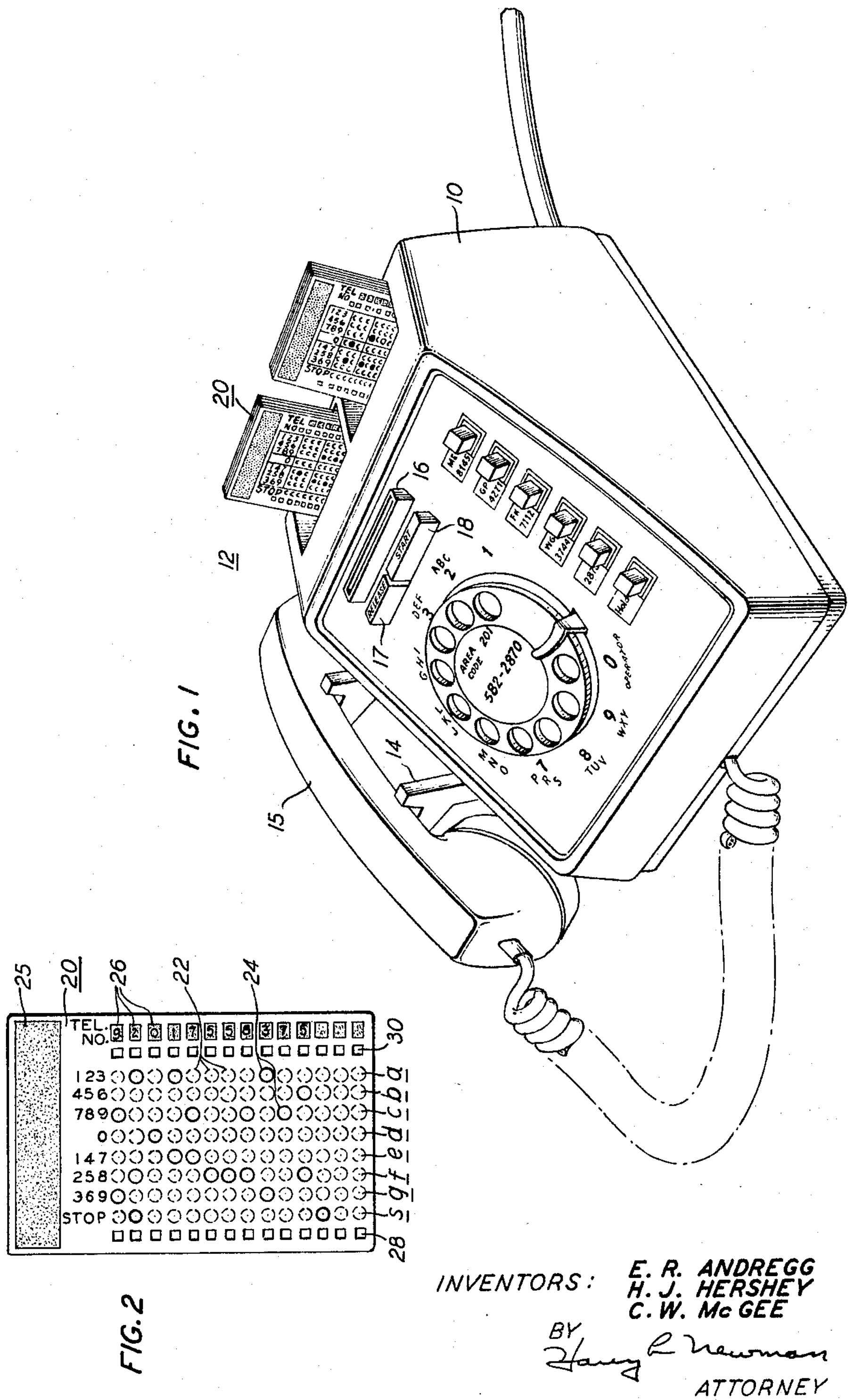
FIG. 1 is a perspective view of a telephone set including the automatic call transmitter of this invention.
FIG. 2 is a plan view of an encoded card that is employed in conjunction with the automatic call transmitter.

The call transmitter of the present invention is designed to supplement the manual dialing facilities of the ordinary telephone set by providing automatic means for dialing frequently called telephone numbers. As shown in FIG. 1, the automatic call transmitter is adapted to be incorporated in a deskstand 10 of a telephone set 12, the deskstand including a switchhook 14 on which a handset 15 is normally positioned. An entryway 16, a release button 17, and a start button 18 of the call transmitter protrudes through the faceplate of the deckstand 10 while encoded cards 20 used in conjunction with the call transmitter are stored in wells in the deskstand.

To operate the call transmitter, the subscriber selects the card 20 that is coded with the telephone number of the party he wishes to call, each card being coded to represent a single telephone number. The card 20 is placed in the entryway 16 and inserted to its full height. Next, the subscriber removes the handset 15 from the switchhook 14 and listens for a dial tone. Hearing one, he depresses the start button 18 and thereby initiates the operation of the call transmitter. During the operation of the call transmitter, the card 20 is stepped out of the entryway 16, and signals corresponding to the telephone number coded on the card are sent to the central office.

Upon completion of the operation of the call transmitter, it is disconnected from the circuit, and then just as in a conventional telephone, the subscriber must wait for the called party to answer. If the line should be busy, the card 20 is already in position within the entryway 16 to be reinserted to its full height. The telephone number may, therefore, be readily called again at the subscriber's discretion. When the called party answers the telephone, the card 20 is removed from the entryway 16 and returned to the wells in the deskstand 10.

As illustrated in FIG. 2, each card 20 comprises a rectangular planar member that is formed to include an array of removable discs arranged in eight longitudinal columns and fourteen transverse rows. Each row of discs 22 is encodable to represent a single digit of a telephone number and is so encoded by removing selected ones of the discs to form one or two code holes 24 in the row, the discs being removed by pressing thereon with a pencil or similar instrument. For purposes of reference, the columns of discs 22 are identified in the drawing by the letters *a, b, c, d, e, f, g,* and *s* reading from right to left, and the particular columns in which code holes 24 are formed to represent the digits one through zero are as follows:

| Digit: | Columns in which code holes are formed |
|---|---|
| 1 | *ae* |
| 2 | *af* |
| 3 | *ag* |
| 4 | *be* |
| 5 | *bf* |
| 6 | *bg* |
| 7 | *ce* |
| 8 | *cf* |
| 9 | *cg* |
| 0 | *d* |

To assist in the use of the card 20, an area 25 is provided at the top of each card for recording the name of the subscriber whose telephone number is to be encoded on the card, and a plurality of areas 26 are provided along one side of each card for recording the individual digits of the subscriber's telephone number, each digit area being in line with one of the rows of discs 22. Furthermore, groups of digits are printed above each of the columns *a* through *g* to indicate in which columns code holes 24 are to be formed to represent each of the digits.

With regard to the discs 22 in the column marked "stop," that is, the *s* column, one of these discs is removed from a particular row when it is desirable to stop the operation of the call transmitter subsequent to the dialing of the digit represented by the previous row. For example, when the call transmitter is being used in an office served by a private branch exchange, it is necessary to dial an initial digit to gain access to an outside trunk line and thereafter observe whether the trunk line is clear before the telephone number of the party to be called can be dialed. In such a situation, the disc 22 in the second row of the *s* column is removed. Then when the encoded card 20 is inserted into the entryway 16 and the start button 18 is depressed, the call transmitter will transmit signals corresponding to the first digit and stop. The calling subscriber will listen for a dial tone indicating that the trunk line is free, and hearing one, he will again depress the start button 18, causing the call transmitter to transmit signals corresponding to the remaining digits encoded on the card.

Another example of when it is necessary to stop the operation of the call transmitter is where a telephone number encoded on the card 20 is less than fourteen digits. The card 20 is provided with fourteen rows of removable discs 22 and is therefore capable of having a fourteen digit telephone number encoded thereon, a fourteen digit telephone number being the largest telephone number presently contemplated for use in the telephone system. Where the telephone number encoded on the card 20 is less than fourteen digits, a disc 22 is removed from the *s* column in the row following the last digit of the telephone number. Thus, subsequent to the transmission of signals corresponding to the last digit, the operation of the call transmitter is stopped instead of having the call transmitter continue to scan the card 20 to ascertain whether any additional digits are encoded thereon. Of course, stopping the call transmitter in this situation results in the card 20 remaining partially inserted into the entryway 16, and to remove the card it is necessary to depress the release button 17.

*Mechanical description*

Figure 3:
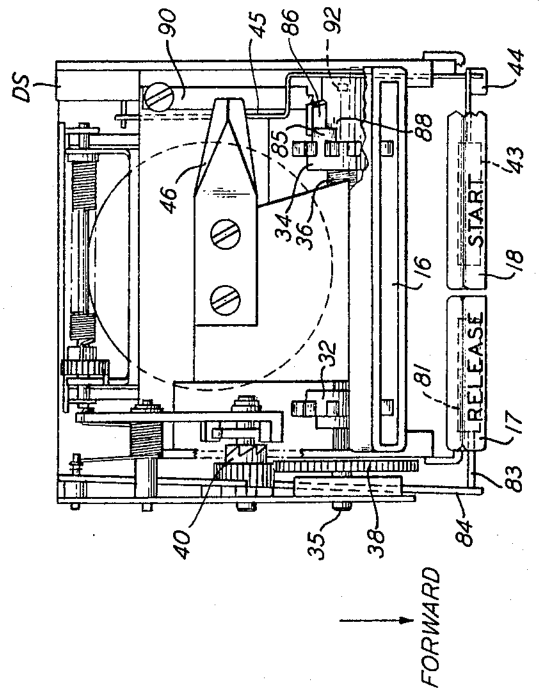
FIG. 3 is a top view of the automatic call transmitter separated from the telephone set with parts broken away for greater clarity.

Bordering the array of discs 22 in the card 20 is a pair of columns of sprocket holes 28 and 30, and when the card is inserted into the entryway 16, the columns of sprocket holes respectively engage the teeth on a pair of sprocket wheels 32 and 34 as shown in FIG. 3. The sprocket wheels 32 and 34 are fixedly mounted on a rotatable shaft 35 and the interaction between the columns of sprocket holes 28 and 30 and the teeth on the sprocket wheels cause the sprocket wheels to be rotated in a forward direction.

A motor spring 36 disposed about the shaft 35 has one end thereof secured to the sprocket wheel 34 and the other end thereof held stationary, and the rotation of the sprocket wheels 32 and 34 results in the winding up of the motor spring and storage of energy therein. The motor spring 36 tends to rotate the sprocket wheels 32 and 34 in a rearward direction so as to move the card 20 out of the entryway 16. However, a gear 38 fixedly mounted on the shaft 35 couples the sprocket wheels to an escapement mechanism 40 that normally permits only forward rotation of the sprocket wheels and thereby normally acts to restrain the motor spring 36.

With the card 20 fully inserted into the entryway 16, the start button 18 is depressed. The start button 18 is mounted on a start plunger 43 that is slidably displaceable along a vertical plane between an upward and a downward position and is biased toward its upward position. The start plunger 43 includes a laterally extending flexible arm 44, and when the plunger is moved to its downward position, the arm interacts with a reciprocally movable start latch 45 to displace the latch rearwardly, a spring member 46 cooperating with the latch to maintain it in a rearward position once it is so displaced. The start latch 45 in moving to its rearward position opeartes a bistable make-before-break dial start switch DS including a pair of normally closed contacts $DS_1$ (FIG. 10) and a pair of normally open contacts $DS_2$ to sequentially close the pair of normally open contacts $DS_2$ and then open the pair of normally closed contacts $DS_1$.

The start plunger 43 in moving to its downward position also actuates a make-before-break restart switch (not shown) including a pair of normally closed contacts $RS_1$ (FIG. 10) and a pair of normally open contacts $RS_2$ to sequentially close the pair of normally open contacts $RS_2$ and then open the pair of normally closed contacts $RS_1$. The contacts return to their normal condition in reverse sequence when the start button 18 is released and the start plunger 43 returns to its upward position.

Figure 4:
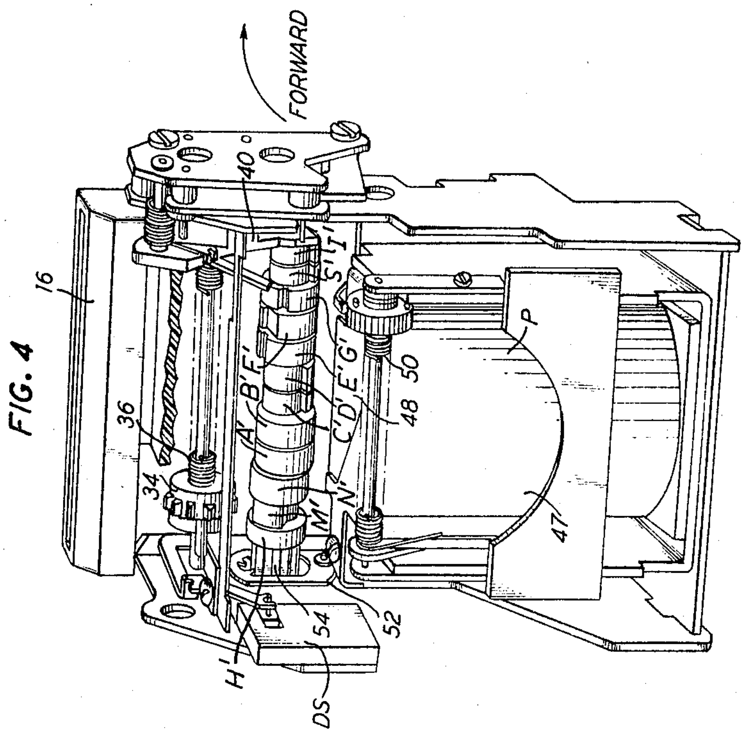
FIG. 4 is a rear perspective view of the automatic call transmitter with parts broken away for greater clarity.

In the usual situation, the actuation of the dial start switch DS initiates the operation of the call transmitter by energizing a coil 47 of a pulsing relay P, illustrated in FIG. 4. The pulsing relay P includes a pivotally mounted armature 48 that is movable between an upward and a downward position, the armature upon energization of the coil 47 being magnetically moved to its downward position and upon de-energization of the coil being mechanically moved to its upward position by a spring member 50.

The armature 48 in moving between its upward and downward positions operates a bistable make-before-break pulsing switch (not shown) including a pair of normally closed contacts $P_1$ (FIG. 9) and a pair of normally open contacts $P_2$. The interaction between the armature 48 and the pulsing switch is such that the armature actuates the switch to sequentially close the normally open contacts $P_2$ and then open the normally closed contacts $P_1$ just shortly before the armature reaches its downward position. Similarly, the armature 48 actuates the pulsing switch to sequentially close the normally closed contacts $P_1$ and then open the normally open contacts $P_2$ thereof just shortly before the armature reaches its upward position.

The armature 48 in moving to its downward position also moves the pawl 52 coupled thereto into engagement with a ratchet wheel 54 to rotate the ratchet wheel in a rearward direction through one-sixteenth of a revolution. The interaction between the pawl 52 and the ratchet wheel 54 is such that the pawl moves the ratchet wheel through the major portion of its increment of rotation before the pulsing switch is operated. The ratchet wheel 54 is fixedly mounted on a shaft on which an encoded or programmed drum 56 is also fixedly mounted, and thus each energization of the pulsing relay P results in the rotation of the encoded drum through one-sixteenth of a revolution, sixteen energizations of the pulsing relay rotating the encoded drum through a complete revolution.

Figure 5:
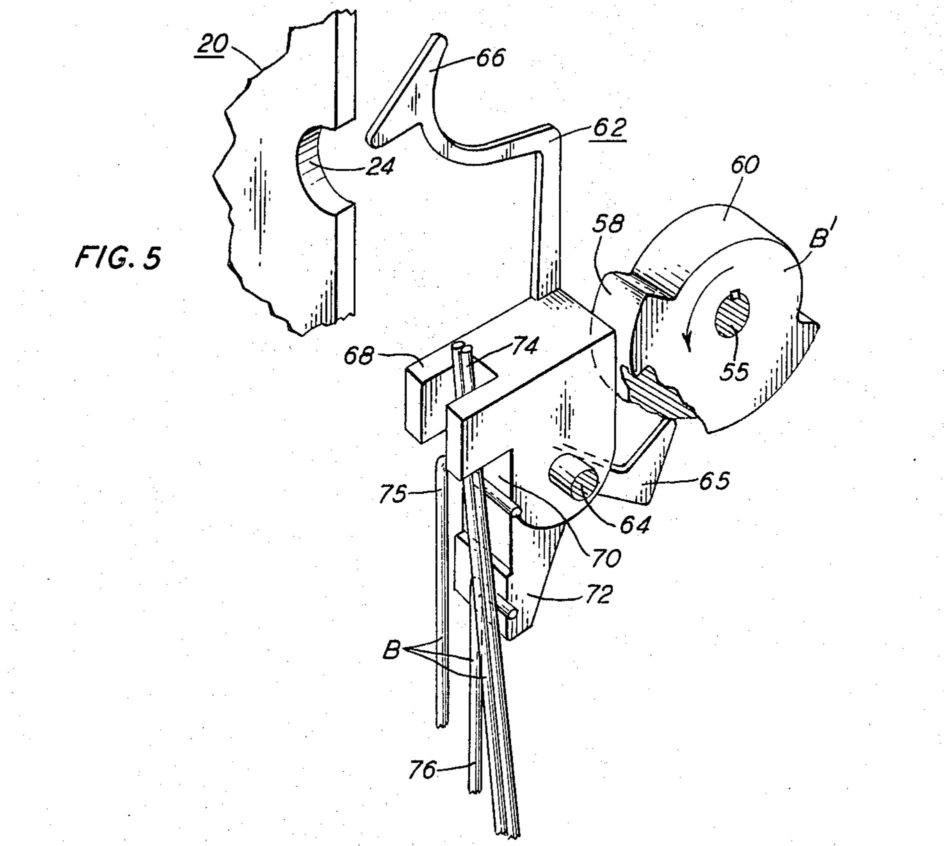
FIG. 5 is a front perspective view of a code switch and the individual sensing member and cam with which it is associated.
Figures 6, 7, 8:
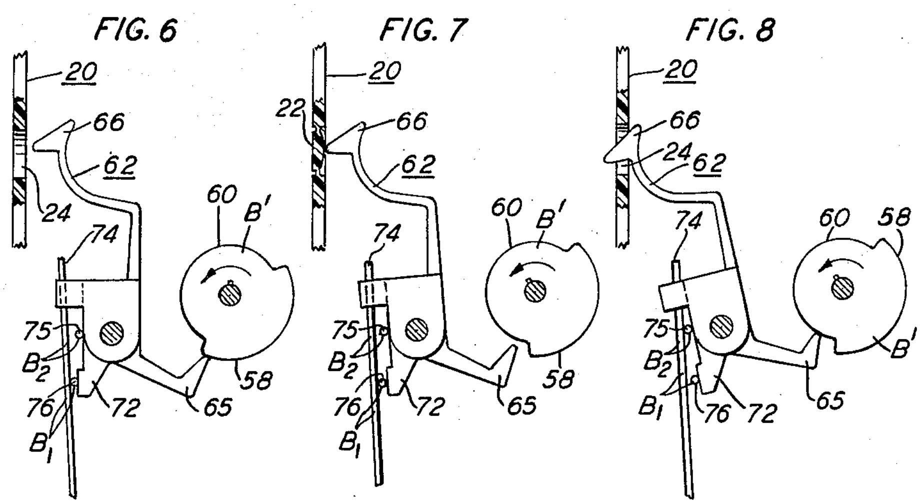
FIG. 6 is a side view showing the relationship between the code switch, its associated sensing member and cam, and the encoded card when the nonoperating portion of the cam is presented to the sensing member.
FIG. 7 is a side view showing the relationship between the code switch, its associated sensing member and cam, and the encoded card when the operating portion of the cam and an uncoded portion of the card is presented to the sensing member.
FIG. 8 is a side view showing the relationship between the code actuated sequence switch, its associated sensing member and cam, and the encoded card when the operating portion of the cam and an encoded portion of the card is presented to the sensing member.

The encoded drum 56 comprises twelve cams indicated by the reference characters H′, M′, N′, A′, B′, C′, D′, E′, F′, G′, S′, and I′, and each cam, like the came B′, shown in FIGS. 5 and 6, comprises one or more nonoperating portions 58 of large radius and one or more operating portions 60 of small radius. In addition, each cam is associated with a dielectric sensing member 62 and a switch having the same letter designation as the cam. The switches and sensing members 62 are basically the same and therefore only the switch B and its associated sensing member will be described in detail.

It is seen in FIGS. 5 and 6 that the switch B is located intermediate the cam B′ and the card 20, the card having been inserted into the entryway 16 (FIG. 4), and the sensing member 62 is located intermediate the cam and the switch. The sensing member 62 is pivotally mounted on a shaft 64 lying forward of and extending parallel to the shaft 55 upon which the cams are secured, and the sensing member includes a follower portion 65 that extends rearwardly into juxtaposition with the cam B′ and a feeler portion 66 that extends forwardly into juxtaposition with the card 20. The forward side of the sensing member 62 further includes a pair of guide arms 68, a central portion 70, and a downwardly extending lower portion 72. The switch B comprises a transfer contact spring 74, a make contact spring 75, and a break contact spring 76, all of which are biased rearwardly toward the sensing member 62. The transfer contact spring 74 is a bifurcated wire spring member, while the make contact spring 75 and the break contact spring 76 are inverted L-shaped wire spring members.

The transverse leg of the make contact spring 75 bears against the central portion 70 of the sensing member 62 approximately in line with the axis of the shaft 64 and therefore the make contact spring imparts essentially no turning moment to the sensing member. The transverse leg of the make contact spring 75, on the other hand, bears against the lower portion 72 of the sensing member 62 and consequently, as viewed in FIG. 6, it imparts a counterclockwise turning moment to the sensing member that tends to move the follower portion 65 into engagement with the cam B′ and the feeler portion 66 into engagement with the card 20.

The upper end of the transfer contact spring 74 is disposed between the guide arms 68 of the sensing member 62, and hence movement of the transfer contact spring is directed along the length of the guide arms. The transfer contact spring 74 overlies the transverse legs of the make contact spring 75 and the break contact spring 76, and because the transverse legs of the make and break contact springs extend intermediate the transfer contact spring and the sensing member, the transfer contact spring engages one or the other of the contact springs depending upon which of the two is positioned the farthest forward.

When, as shown in FIG. 6, the nonoperating portion 58 of the cam B′ is positioned in juxtaposition with the follower portion 65 of the sensing member 62, the nonoperating portion engages the follower portion and positions the sensing member with the feeler portion 66 thereof spaced from the card 20. In this position the lower portion 72 of the sensing member 62 locates the break contact spring 76 forward of the make contact spring 75, and thus the transfer contact spring 74 engages the break contact spring 76 and is spaced from the make contact spring 75. This is considered to be the normal condition, and therefore the make contact spring 75 and the break contact spring 76 provide a pair of normally closed contacts $B_1$, the subnumeral one being applied to the normally closed contacts of each of the switches associated with a cam, and the transfer contact spring 74 and make contact spring 75 provide a pair of normally open contacts $B_2$, the subnumeral two being used to indicate the normally open contacts of each of the switches associated with a cam.

When, as shown in FIGS. 7 and 8, the operating portion 60 of the cam B′ is moved into juxtaposition with the follower portion 65 of the sensing member 62, the break contact spring 76 rotates the sensing member in a counterclockwise direction, moving the feeler portion 66 toward the card 20 and moving the lower portion 72 rearwardly. If, as shown in FIG. 7, a disc 22 is presented to the feeler portion 66, the rotation of the sensing member 62 is arrested by the disc. The transfer contact spring 74 remains in engagement with the break contact spring 76, whereby the normally closed contacts $B_1$ remain closed and the transfer contact spring 74 remains spaced from the make contact spring 75 whereby the normally open contacts $B_2$ remain open. When the nonoperating portion 58 of the cam B′ subsequently moves into engagement with the follower portion 65 of the sensing member 62, the sensing member is rotated in a clockwise direction and the feeler portion 66 is again moved to a spaced position from the card 20.

If, as shown in FIG. 8, a code hole 24 is presented to the feeler portion 66 of the sensing member 62, the counterclockwise rotation of the sensing member is arrested by the engagement of the follower portion 65 with the operating portion 60 of the cam, the feeler portion moving into the code hole. The sensing member 62 rotates through a greater distance than when its rotation is arrested by the engagement of the feeler portion 66 with a disc 22, and therefore the lower portion 72 is rotated a greater distance rearwardly. Both the transfer contact spring 74 and the break contact spring 76 move rearwardly with the lower portion 72 until the rearward motion of the transfer contact spring is arrested by its engagement with the make contact spring 75, whereupon the normally open contacts $B_2$ close. The break contact spring 76 continues to move rearwardly with the lower portion 72, and thus immediately thereafter the break contact spring separates from the transfer contact spring 74, whereupon the normally closed contacts $B_1$ open.

When the nonoperating portion 58 of the cam subsequently rotates into engagement with the follower portion 65 of the sensing member 62, the sensing member is rotated in a clockwise direction, withdrawing the feeler portion 66 from the code hole 24 and moving the lower portion 72 and thereby the break contact spring 76 forwardly. The forward motion of the break contact spring 76 brings it into engagement with the transfer contact spring 74 whereby the normally closed contacts $B_1$ close. Immediately thereafter, the break contact spring 76 deflects the transfer contact spring 74 from the make contact spring 75 whereby the normally open contacts $B_2$ open.

The switches A, C, D, E, F, G, and S and the sensing members 62 associated therewith are all identical to the switch B and its associated sensing member, and the sensing members associated with the cams A′, B′, C′, D′, E′, F′, G′, and S′ are located so that when a card 20 is inserted into the entryway 16 (FIG. 3) the feeler portions 66 thereof respectively extend into juxtaposition with the columns of discs *a*, *b*, *c*, *d*, *e*, *f*, *g*, and *s* (FIG. 2). In addition, the escapement mechanism 40 (FIG. 3) acting through the sprocket wheels 32 and 34 locates the card 20 so that an individual row of discs 22 is always located in juxtaposition with the feeler portions 66.

It is seen that the switches A, B, C, D, E, F, G, and S are conditioned to be actuated in a particular sequence by their associated cams interacting with their associated sensing members 62, but they are only actuated if a code hole 24 is presented to their associated sensing members. Thus these switches are code responsive sequence switches. For purposes of brevity they will be referred to as code switches and the contacts thereof will be referred to as code contacts.

The switches H, M, N, and I are the same as the switch B, but the sensing members 62 associated therewith do not include a feeler portion 66. As a result, the switches H, M, N, and I are actuated in a particular sequence by their associated cams interacting with their associated sensing members 62. They are, therefore, sequence switches. The sequence switch H does not require a pair of normally closed contacts and so no connection is made to its break contact spring 76. In addition, the sequence switch I does not require a pair of normally open contacts and so no connection is made to its make contact spring 75.

Figure 9:
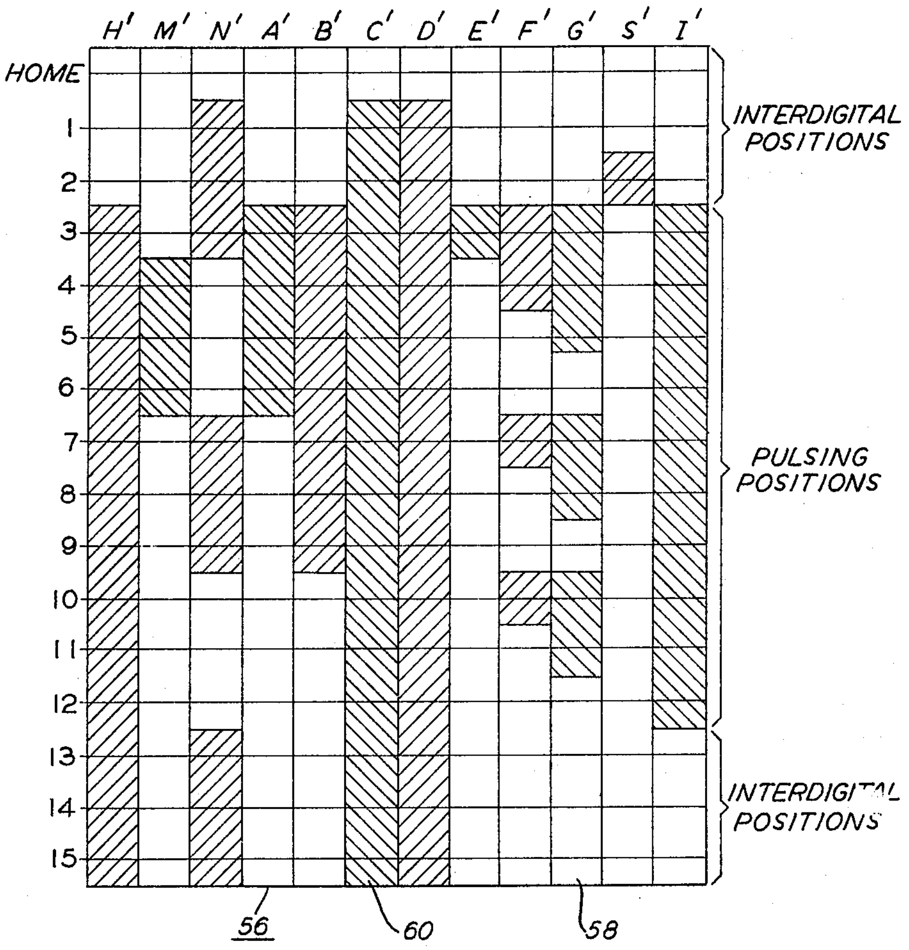
FIG. 9 is a development of the encoded drum of the automatic call transmitter, the operating portions of the individual cams comprising the encoded drum being designated by crosshatching.

Referring now to FIG. 9, there is shown a graphic development of each of the cams H′, M′, N′, A′, B′, C′, D′, E′, F′, G′, S′, and I′ with the operating portions 60 thereof indicated by crosshatched areas and the nonoperating portions 58 thereof indicated by clear areas. The development is overlaid by a grid to show the sixteen positions occupied by the cams with respect to the follower portions 65 of their associated sensing members 62 during each complete revolution of the encoded drum 56.

As exemplified by the interaction between the cam B′, the switch B, and their associated sensing member 62, the rotation of the drum 56 results in the cams operating their associated switches or conditioning their associated switches for operation in a particular sequence, which sequence is determined by the locations of the operating portions 60 of the cams with respect to each other. Generally this sequence may be described as including six interdigital positions, home, first, second, thirteenth, fourteenth, and fifteenth, and ten pulsing positions, third through the twelfth. During the interdigital positions no pulses are ever transmitted out on the telephone line, this silent period being used to indicate to the central office that a digit has been completed and the pulses next transmitted are a subsequent digit. During the pulsing positions, the pulses corresponding to a particular encoded digit are transmitted out on the telephone line.

Referring again to FIGS. 3 and 4, in addition to the encoded drum 56 described above, an escapement cam (not shown) is also fixedly mounted on the shaft 55. The escapement cam actuates the escapement mechanism 40 so that as the encoded drum 56 moves from its fifteenth to its home position, the sprocket wheels 32 and 34 are permitted to advance the card 20 out of the entryway 16 so as to present the next row of discs 22 (FIG. 2) to the feeler portions 66 (FIG. 6) of the code switches A, B, C, D, E, F, G, and S.

If it becomes desirable to remove the card 20 once it has been inserted into the entryway 16, the release button 17 is depressed. The release button is mounted on a release plunger 81 that is slidably displaceable along a vertical plane between an upward and a downward position and is biased toward its upward position. The release plunger 81 includes an obliquely extending finger 82 that laterally displaces a release arm 84 when the plunger is moved to its downward position. The release arm 84 when so displaced disengages the escapement mechanism 40 and permits the motor spring 36 to rotate the sprocket wheels 32 and 34 in a rearward direction, thereby moving the card 20 out of the entryway 16.

As the card 20 moves out of the entryway 16, any feeler portions 66 (FIG. 8) of the sensing members 62 positioned within the code holes 24 in the card are deflected out of the code holes by the bottom edges of the holes, the sensing members being rotated in a clockwise direction. The feeler portions 66 of these sensing members 62 then ride along the surface of the card 20 in the manner shown in FIG. 7, and in this position the switches associated with these sensing members are returned to a normal condition.

In addition, as the sprocket wheels 32 and 34 rotate rearwardly, a tab 85 on the sprocket wheel 34 engages a vane 86 on a detent 88 that is rotatively mounted on the shaft 35. The sprocket wheel 34 rotates the detent 88 in a rearward direction, and at the point that the card 20 is moved to a threshold position in the entryway 16 and the teeth on the sprocket wheels 32 and 34 are respectively disengaged from the columns of sprocket holes 28 and 30 (FIG. 2) in the card, the vane 86 of the detent engages a stop 90 whereby the rearward rotation of the detent and the sprocket wheels is arrested.

Furthermore, just as the vane 86 of the detent 88 engages the stop 90, a vane 92 of the detent engages a shoulder on start latch 45 and displaces the start latch forwardly. The start latch 45 in returning to its forward position operates the dial start switch DS to open the pair of normally open contacts $DS_2$ (FIG. 10) and then close the pair of normally closed contacts $DS_1$.

*Electrical description*

Figure 10:
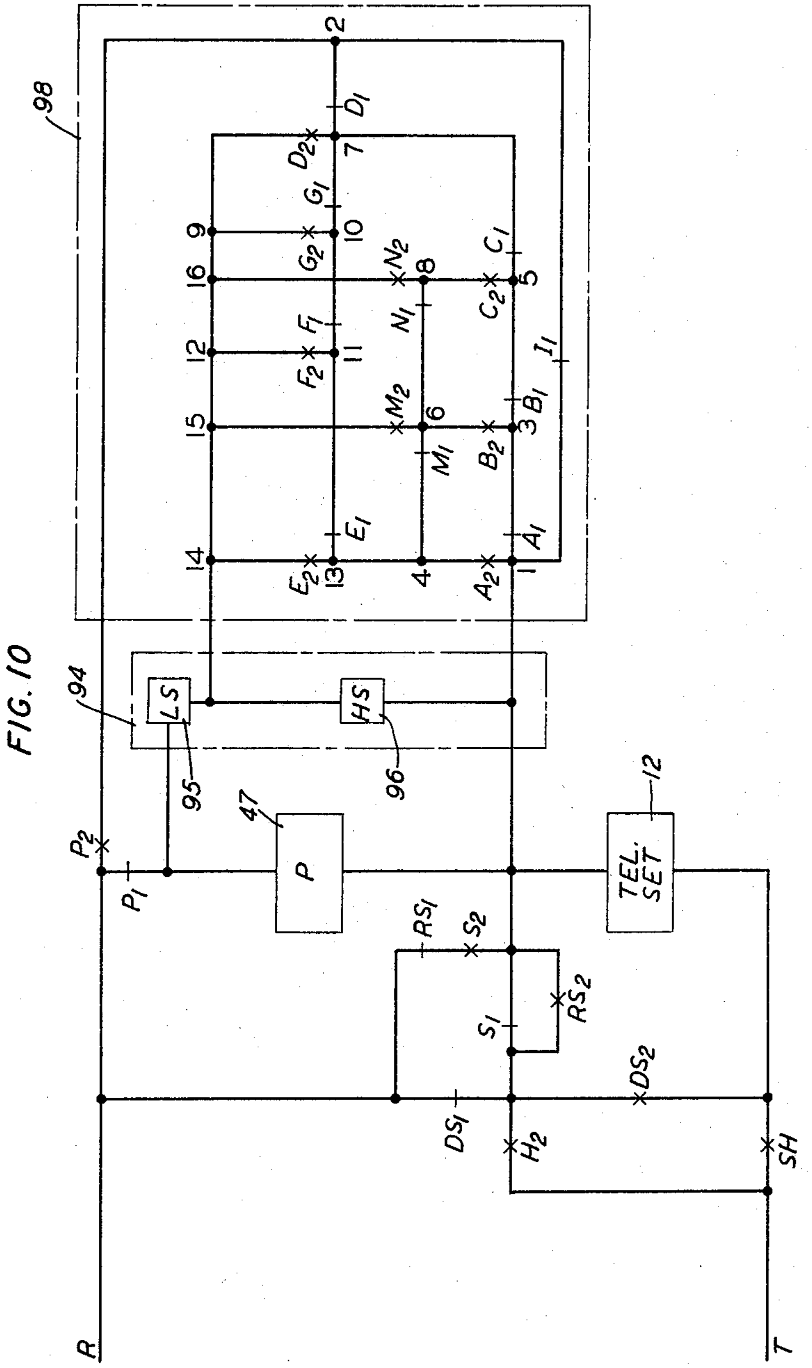
FIG. 10 is a schematic circuit diagram of the automatic call transmitter.

Turning now to FIG. 10, the telephone set 12 with which the call transmitter is associated is of the conventional type such as that disclosed in Patent 2,629,783 issued to H. F. Hopkins on February 24, 1953 and assigned to the assignee of this invention. The telephone set 12 is connected in series with the coil 47 of the pulsing relay P of the call transmitter but shunt paths are provided around both the telephone set and the coil so that depending upon the condition of the dial start switch DS one or the other is effectively connected across the telephone line. When the dial start switch DS is in the normal condition, the telephone set 12 is connected to the tip side of the telephone line through the normally open switchhook contacts SH and connected to the ring side of the telephone line through the normally closed code contacts $S_1$ and the normally closed dial start contacts $DS_1$. When the dial start switch DS is actuated, the coil 47 of the pulsing relay P is connected to the tip side of the telephone line through the normally closed code contacts $S_1$, the normally open dial start contacts $DS_2$, and the normally open switchhook contacts SH and connected to the ring side of the telephone line through the normally closed pulsing contacts $P_1$. The telephone set 12 is also connectable to the ring side of the telephone line through the normally open code contacts $S_2$ and the normally closed restart contacts $RS_1$, while the coil 47 is also connectable to the tip side of the telephone line through the normally open restart contacts $RS_2$ and the normally open sequence contacts $H_2$.

As set forth in the mechanical description, the energization of the coil 47 of the pulsing relay P results in the closing of the normally open contacts $P_2$ and then the opening of the normally closed contacts $P_1$. The connection of the coil 47 across the telephone line is thereby interrupted and the coil is de-energized. Furthermore, if no alternative path is provided between the ring and tip sides of the telephone line, the interruption results in the transmission of a pulse out on the line. Upon the de-energization of the coil 47, the normally closed contacts $P_1$ close and then the normally open contacts $P_2$ open. The connection of the coil 47 across the telephone line is thereby re-established and the coil is again energized. The interval during which the coil 47 is connected across the telephone line is referred to as the operate interval, and the interval during which the coil is disconnected from the telephone line is referred to as the release interval.

The speed at which the pulsing relay P operates to interrupt and re-establish its connection across the telephone line is determined by the mechanical and magnetic forces acting upon the armature 48 (FIG. 4) and by a two speed timing network 94 in parallel with the coil 47 of the pulsing relay. The timing network 94 comprises a low speed section 95 connected in series with a high speed section 96, and it is designed so that if during the operate interval of the operation of the pulsing relay P a path is provided around the high speed section and therefore current only flows through the low speed section, the pulsing relay operates at the normal rate of ten operations per second. However, if during the operate interval of the operation of the pulsing relay P no path is provided around the high speed section 96 and the current flows through both the low speed section 95 and the high speed section, the pulsing relay operates at a faster rate, such as twenty operations per second.

Whether a path is provided around the high speed section 96 of the timing network 94 during the operate interval of the operation of the pulsing relay P and also whether a path is provided between the ring and tip sides of the telephone line during the release interval of the operation of the pulsing relay is determined by a switching matrix 98 including the code switches A, B, C, D, E, F, and G and the sequence switches M, N, and I.

The switching matrix 98 consists of a first circuit point connected to a second circuit point by the normally closed sequence contacts $I_1$, and connected to a third circuit point by the normally closed code contacts $A_1$, and connected to a fourth circuit point by the normally open code contacts $A_2$. The third circuit point is connected to a fifth circuit point by the normally closed code contacts $B_1$ and connected to a sixth circuit point by the normally open code contacts $B_2$, the sixth circuit point being connected to the fourth circuit point by the normally closed sequence contacts $M_1$. The fifth circuit point is connected to a seventh circuit point by the normally closed code contacts $C_1$ and to an eighth circuit point by the normally open code contacts $C_2$, the eighth circuit point being connected to the sixth circuit point by the normally closed sequence contacts $N_1$.

The seventh circuit point is connected to the second circuit point by the normally closed code contacts $D_1$ and connected to a ninth circuit point by the normally open code contacts $D_2$, and the seventh circuit point is connected to a tenth circuit point by the normally closed code contacts $G_1$, the tenth circuit point being connected to the ninth circuit point by the normally open code contacts $G_2$. An eleventh circuit point is connected to the tenth circuit point by the normally closed code contacts $F_1$ and connected to a twelfth circuit point by the normally open code contacts $F_2$, and a thirteenth circuit point is connected to the eleventh circuit point by the normally closed code contacts $E_1$ and connected to a fourteenth circuit point by the normally open code contacts $E_2$, the thirteenth circuit point also being connected to the fourth circuit point. The fourteenth circuit point is connected to the twelfth circuit point and the normally open sequence contacts $M_2$ connect the sixth circuit point to a fifteenth circuit point intermediate and in series with the twelfth and fourteenth circuit points. Similarly, the twelfth circuit point is connected to the ninth circuit point and the normally open sequence contacts $N_2$ connect the eighth circuit point to a sixteenth circuit point intermediate and in series with the ninth and twelfth circuit points.

The first circuit point is connected to one side of the high speed section 96 and the fourteenth circuit point is connected to the other side of the high speed section, and thus during the operate interval of the operation of the pulsing relay P the switching matrix 98 is connected in parallel with the high speed section. In addition, the first circuit point is connected to the tip side of the coil 47 of the pulsing relay P and the second circuit point is connected by the normally open pulsing contacts $P_2$ to the ring side of the telephone line, and thus during the release interval of the operation of the pulsing relay, the switching matrix 98 is connected across the telephone line.

*Description of operation*

In the description of operation that follows, the description will relate to FIGS. 9 and 10 and to the figures set forth in parentheses, the figure in parentheses applying until a subsequent figure in parentheses is set forth. It will be assumed that the call transmitter is being used in an office served by a private branch exchange.

The subscriber begins the operation of the call transmitter by selecting the card 20 (FIG. 1) that is coded with the telephone number of the subscriber he wishes to call. For purposes of the present description it will be assumed that the encoded card 20 selected is the card shown in FIG. 2. The encoded card 20 is placed in the entryway 16, and the card is inserted to its full height. The interaction between the columns of sprocket holes 28 and 30 (FIG. 2) in the encoded card 20 and the sprocket wheels 32 and 34 (FIG. 3) results in the winding up of the motor spring 36, and when the card is fully inserted, the card is positioned with the first row of discs 22 presented to the feeler portions 66 (FIG. 6) of the sensing members 62 associated with the code switches A, B, C, D, E, F, G, and S. As the digit nine is encoded in the first row of the card 20 (FIG. 2), code holes 24 are formed in the *c* and *g* columns.

The subscriber removes the handset 15 (FIG. 1) from the switchhook 14, thereby closing the normally open switchboard contacts SH, and the telephone set 12 is connected across the telephone line. A path is provided from the tip side of the telephone line through the closed normally open switchhook contacts SH, the telephone set 12, the closed normally closed code contacts $S_1$, and the closed normally closed dial start contacts $DS_1$ to the ring side of the telephone line, the path between the telephone set and the ring side of the telephone line providing a short around the coil 47 of the pulsing relay P.

The subscriber listens for a dial tone, and hearing one, he depresses the start button 18 (FIG. 3). The depression of the start button 18 moves the start plunger 43 downwardly, and the flexible arm 44 thereof deflects the start latch 45 rearwardly. The start latch 45, in moving from its forward to its rearward position, operates the dial start switch DS to close the normally open contacts $DS_2$ and then open the normally closed contact $DS_1$. As a result, the short across the coil 47 of the pulsing relay P is removed and a short is placed instead across the telephone set 12. A path is provided from the tip side of the telephone line through the closed normally open switchhook contacts SH, the closed normally open dial start contacts $DS_2$, the closed normally closed code contacts $S_1$, the coil 47, and the closed normally closed pulsing contacts $P_1$ to the ring side of the telephone line. Thus, the coil 47 is energized.

The energization of the coil 47 (FIG. 4) of the pulsing relay P moves the armature 48 thereof to its downward position, and the downward motion of the armature moves the pawl 52 into engagement with the ratchet wheel 54 and rotates the ratchet wheel and thereby the encoded drum 56 through one-sixteenth of a revolution. The encoded drum 56 is moved from the home to the first position, and in the first position the operating portions 60 of the cams N′, C′, and D′ are respectively presented to the follower portions 65 of the sensing members 62 associated with the sequence switch N and the code switches C and D. As a result, the sequence switch N is actuated to close the normally open contacts $N_2$ and open the normally closed contacts $N_1$ thereof. In addition, as a code hole 24 (FIG. 2) appears in the *c* column of the first row of discs 22, the code switch C is actuated to close the normally open contacts $C_2$ and open the normally closed contacts $C_1$ thereof. Since, however, no code hole appears in the *d* column of the first row, the code switch D remains in its normal condition.

The energization of the coil 47 of the pulsing relay P also results in the operation of the pulsing switch (not shown) to sequentially close the normally open contacts $P_2$ and then open the normally closed contacts $P_1$. The closing of the normally open pulsing contacts $P_2$ connects the switching matrix 98 across the telephone line, and as a path is provided from the first circuit point through the closed normally closed sequence contacts $I_1$ to the second circuit point, a path is provided between the tip and ring sides of the telephone line. The subsequent opening of the normally closed pulsing contacts $P_1$ interrupts the connection of the coil 47 across the telephone line, but since the path between the tip and ring sides of the telephone line is maintained, no pulse is transmitted out on the telephone line.

The disconnection of the coil 47 of the pulsing relay P from the telephone line results in its de-energization, and the armature 48 under the bias of the spring member 50 returns to its upward position. The armature 48 in moving to its upward position operates the pulsing switch (not shown) to sequentially close the normally closed contacts $P_1$ and then open the normally open contacts $P_2$. The coil 47 is thereby re-connected across the telephone line and energized again.

In the first position of the encoded drum 56, due to the actuation of the code switch C and the sequence switch N, a shunt path is provided through the switching matrix 98 around the high speed section 96 of the timing network 94, the path extending from the first circuit point through the closed normally closed code contacts $A_1$, the closed normally closed code contacts $E_1$, the closed normally open code contacts $C_2$, and the closed normally open sequence contacts $N_2$ to the fourteenth circuit point. The pulsing relay P therefore operates at its normal rate.

As before, the energization of the coil 47 of the pulsing relay P results in the rotation of the encoded drum 56 through one-sixteenth of a revolution and the sequential closing of the normally open pulsing contacts $P_2$ and the opening of the normally closed pulsing contacts $P_1$. The encoded drum 56 is moved to the second position and in this position the operating portion 60 of the cam S′ is presented to the follower portion 65 of the sensing member 62 associated with the code switch S. No code hole appears in the *s* column of the first row and therefore the code switch S remains in its normal condition. Since the sequence and code switches are in the same condition as in the first position, no pulse is transmitted out on the telephone line and the pulsing relay P operates at its normal rate.

On the third energization of the coil 47 of the pulsing relay P, the encoded drum 56 is advanced to its third position whereupon the operating portions 60 of the cams A′, B′, E′, F′, G′, H′, and I′ are respectively presented to the sensing members 62 associated with the code switches A, B, E, F, and G and the sequence switches H and I. Since a code hole 24 (FIG. 2) appears in the *g* column of the first row of discs 22 in the card 20, the code switch G is actuated to close the normally open contacts $G_2$ and open the normally closed contacts $G_1$. In addition, the sequence switch I is actuated to open the normally closed contacts $I_1$ thereof. As a result, no path is provided between the first and second circuit points of the switching matrix 98 and therefore with the closing of the normally open pulsing contacts $P_2$ and the opening of the normally closed pulsing contacts $P_1$, the telephone line is interrupted and a pulse is transmitted thereover. However, the same path, as in the second position of the encoded drum 56, is provided between the first and fourteenth circuit points of the switching matrix 98, and therefore the pulsing relay again operates at the normal rate.

The actuation of the sequence switch H closes the normally open contacts $H_2$ thereof, and this provides a path that bypasses the normally open switchhook contacts SH and the normally open dial start contacts $DS_2$. This path assures that even if the subscriber decides to terminate the operation of the call transmitter by returning the handset 15 (FIG. 1) to the switchhook 14 and removing the card 20 from the entryway 16, the call transmitter will continue to receive power from the telephone line until the encoded drum 56 is returned to the home position whereupon the sequence contacts $H_2$ open and the call transmitter is disconnected from the telephone line. By always returning the encoded drum to the home position, inaccurate dialing by the call transmitter is prevented.

In the fourth position of the encoded drum 56, the cam M′ actuates the sequence switch M to close the normally open contacts $M_2$ and open the normally closed contacts $M_1$ thereof, and the cam N′ actuates the sequence switch N to close the normally closed contacts $N_1$ and open the normally open contacts $N_2$ thereof. In the fifth position of the encoded drum 56, no change occurs in the switching matrix 98, and in the sixth position of the encoded drum, the cam G′ actuates the code switch G to close the normally closed contacts $G_1$ and open the normally open contacts $G_2$ thereof.

In each of these positions, no path is provided between the first and second circuit points and therefore a second, third and fourth pulse is transmitted out on the telephone line. However, a path is provided from the first circuit point through the closed normally closed code contacts $A_1$, the closed normally closed code contacts $B_1$, the closed normally open code contacts $C_2$, the closed normally closed sequence contacts $N_1$, and the closed normally open sequence contacts $M_2$ to the fourteenth circuit point, and the pulsing relay P therefore operates at the normal rate.

In the seventh position of the encoded drum 56, the cam M′ actuates the sequence switch M to close the normally closed contacts $M_1$ and open the normally open contacts $M_2$ thereof, and the cam N′ actuates the sequence switch N to close the normally open contacts $N_2$ and open the normally closed contacts $N_1$ thereof. In addition, the cam G′ actuates the code switch G to close the normally open contacts $G_2$ and open the normally closed contacts $G_1$ thereof a second time. In the eighth position of the encoded drum 56, no change occurs in the switching matrix 98, and in the ninth position of the encoded drum 56, the cam G′ actuates the code switch G to close the normally closed contacts $G_1$ and open the normally open contacts $G_2$ thereof a second time.

Again in each of these positions, no path is provided between the first and second circuit points and therefore a fifth, sixth, and seventh pulse is transmitted. But a path is provided from the first circuit point through the closed normally closed code contacts $A_1$, the closed normally closed code contacts $B_1$, the closed normally open code contacts $C_2$, and the closed normally open sequence contacts $N_2$ to the fourteenth circuit point, and therefore the pulsing relay continues to operate at the normal rate.

In the tenth position of the encoded drum 56, the cam N′ again actuates the sequence switch N to close the normally closed contacts $N_1$ and open the normally open contacts $N_2$ thereof, and the switch G′ actuates the code switch G to close the normally open contacts $G_2$ and open the normally closed contacts $G_1$ thereof a third time. In the eleventh position of the encoded drum 56, no change occurs in the switch matrix 98. Still no path is provided between the first and second circuit points and hence an eighth and a ninth pulse is transmitted out on the telephone line. A path is, however, provided from the first circuit point through the closed normally closed code contacts $A_1$, the closed normally closed code contacts $B_1$, the closed normally open code contacts $C_2$, the closed normally closed sequence contacts $N_1$, the closed normally closed sequence contacts $M_1$, the closed normally closed code contacts $E_1$, the closed normally closed code contacts $F_1$, and the closed normally open code contacts $G_2$ to the fourteenth circuit point, and the pulsing relay P operates at the normal rate.

Finally, in the twelfth position of the encoded drum 56, the cam G′ actuates the code switch G to close the normally closed contacts $G_1$ and open the normally open contacts $G_2$ thereof a third time. A path is then provided from the first circuit point through the closed normally closed code contacts $A_1$, the closed normally closed code contacts $B_1$, the closed normally open code contacts $C_2$, the closed normally closed sequence contacts $N_1$, the closed normally closed sequence contacts $M_1$, the closed normally closed code contacts $E_1$, the closed normally closed code contacts $F_1$, and closed normally closed code contacts $G_1$, and the closed normally closed code contacts $E_1$ to the second circuit point. As a path is provided between the tip and ring sides of the telephone line, no pulse is transmitted out on the line. No path, however, is provided between the first and fourteenth circuit points and therefore current is forced to flow through the high speed section 96 of the timing network 94 and the pulsing relay P operates at the higher speed.

In the thirteenth, fourteenth, and fifteenth positions of the encoded drum 56, the cam N′ actuates the sequence switch N to close the normally open contacts $N_2$ and open the normally closed contacts $N_1$, and the cam I′ actuates the sequence switch I to close the normally closed contacts thereof. In each of these positions, as in the second and third positions, a path is provided through the switching matrix between the first and the second circuit points and between the first and the fourteenth circuit points. No pulses are therefore transmitted out on the telephone line, and the pulsing relay P operates at its normal rate.

As the encoded drum 56 moves back to the home position, the cam H′ actuates the sequence switch H to open the normally open contacts $H_2$ thereof, the cam N′ actuates the sequence switch N to close the normally closed contacts $N_1$ and open the normally open contacts $N_2$ thereof, and the cam C′ actuates the code switch C to close the normally closed contacts $C_1$ and open the normally open contacts $C_2$ thereof. A path is provided between the first and second circuit points whereby no pulse is transmitted out on the telephone line, but no path is provided between the first and fourteenth circuit points whereby the pulsing relay P operates at the higher speed.

In addition, as the encoded drum 56 is moved back to the home position, the escapement cam (not shown), mounted on the same shaft with the encoded drum, actuates the escapement mechanism 40 (FIG. 4) to permit the gear 38 (FIG. 3) and thereby the sprocket wheels 32 and 34 to rotate in a rearward direction through the distance necessary to move the second row of discs 22 (FIG. 2) of the card 20 into juxtaposition with the sensing members 62 associated with the code switches.

The digit two is encoded in the second row of the card 20 (FIG. 2) and therefore code holes 24 appear in the *a* and *f* colums. Furthermore, a code hole 24 appears in the *s* or stop column of the second row.

As before, the movement of the encoded drum 56 from the hole to the first position presents the operating portions 60 of the cams N′, C′, and D′ to the sensing members 62 associated therewith. The sequece switch N is actuated to close the normally open contacts $N_2$ and open the normally closed contacts $N_1$ thereof. But as code holes 24 appear in either the *c* or *d* columns, the code switches C and D are not actuated. Thus as in the home position, a path is provided between the first and second circuit points whereby no pulse is transmitted out on the telephone line, and no path is provided between the first and fourteenth circuit points whereby the pulsing relay P operates at the higher speed.

In the second position of the encoded drum 56, the operating portion 60 of the cam S′ is again presented to the sensing member 62 associated therewith and as a code hole 24 appears in the *s* column of the second row of the card 20, the code switch S is actuated to close the normally open contacts $S_2$ and open the normally closed contacts $S_1$ thereof. As a result, the telephone set 12 is connected across the telephone line, a path being provided from the tip side of the line through the closed normally open switchhook contacts SH, the telephone set 12, the closed normally open code contacts $S_2$, and the closed normally closed restart contacts $RS_1$ to the ring side of the telephone line, and then the pulsing relay P is disconnected from the telephone line, stopping the operation of the call transmitter.

Assuming that the purpose of the first digit was to gain access to an outside trunk line, the subscriber listens for a dial tone indicating that a trunk line is available. Hearing a dial tone, the subscriber depresses the start button 18 (FIG. 3), moving the start plunger 43 to its downward position and thereby operating the restart switch (not shown) to sequentially close the normally open contacts $RS_2$ and then open the normally closed contacts $RS_1$ thereof. The pulsing relay P is thereby reconnected across the telephone line, a path being provided from the tip side of the telephone line through the closed normally open switchhook contacts SH, the closed normally open dial start contacts $DS_2$, the closed normally open restart contacts $RS_2$, the coil 47 of the pulsing relay P, and the closed normally closed pulsing contacts $P_1$ to the ring side of the telephone line, and then the telephone set 12 is disconnected from the telephone line.

The call trasmitter commences operation again, and the pulsing relay P moves the encoded drum to the third position whereupon the nonoperating portion 58 of the cam S′ and the operating portions 60 of the cams H′, A′, B′, E′, F′, G′, H′, and I′ are presented to the sensing members 62 thereof. The code switch S is actuated to close the normally closed contacts $S_1$ and open the normally open contacts $S_2$ thereof, and thus when the subscriber removes his finger from the start button 18 and thereby permits the normally closed restart contacts $RS_1$ to close and the normally open restart contacts $RS_2$ to open, the pulsing relay P continues to be connected across the telephone line and the telephone set 12 continues to be disconnected from the telephone line.

In addition, the sequence switch H is actuated to close the normally open contacts $H_2$ thereof and thereby again provides the shunt path around the normally open switchhook contacts SH and the normally open dial start contacts $DS_2$. Finally, the code switches A and F and the sequence switch I are actuated to respectively close the normally open contacts $A_2$, open the normally closed contacts $A_1$, close the normally open contacts $E_2$, open the normally closed contacts $E_1$, and open the normally open contacts $I_1$. As a result, no path is provided between the first and second circuit points, and a first pulse is transmitted out on the telephone line. However, a path is provided from the first circuit point through the closed normally open code contacts $A_2$, the closed normally closed code contacts $E_1$, and the closed normally open code contacts $F_2$ to the fourteenth circuit point and therefore the pulsing relay P operates at the normal rate.

In the fourth position of the encoded drum 56, the cam M′ actuates the sequence switch M to close the normally open contacts $M_2$ and open the normally closed contacts $M_1$ thereof, and the cam N′ actuates the sequence switch N to close the normally closed contacts $N_1$ and open the normally open contacts $N_2$ thereof. Again no path is provided between the first and second circuit points while the same path as in the third position of the encoded drum 56 is provided between the first and fourteenth circuit points. Thus a second pulse is transmitted out on the telephone line, and the pulsing relay P continues to operate at the normal rate.

In the fifth position of the encoded drum 56, the cam F′ actuates the code switch F to close the normally closed contacts $F_1$ and open the normally open contacts $F_2$ thereof. As a result, a path is provided from the first circuit point through the closed normally open code contacts $A_2$ and the closed normally closed code contacts $E_1$, $F_1$, $G_1$, and $D_1$ to the second circuit point, whereby no pulse is transmitted, and no path is provided between the first and fourteenth circuit points, whereby the pulsing relay P operates at the faster rate. The same conditions exist in the sixth through home positions of the encoded drum 56, the only change occurring in the seventh position whereat the cam A' actuates the code switch A to close the normally closed contacts $A_1$ and open the normally open contacts $A_2$ thereof. Thereafter the path between the first and second circuit points is through the closed normally closed code contacts $A_1$, $B_1$, $C_1$, and $D_1$.

In transmitting the third and subsequent digits of the telephone number, the call transmitter repeats its basic pattern of operation for each digit. During the interdigital positions of the encoded drum 56, a path is provided between the first and second circuit points of the switching matrix 98 and no pulses are transmitted out on the telephone line. In addition, if the encoded digit presented to the sensing members 62 is the digit seven, eight, nine, or zero, a path is provided through the switching matrix 98 between the first and fourteenth circuit points except in the home position and thus the pulsing relay P operates at the normal speed except in the home position where it operates at the higher speed. If, on the other hand, the digit one, two, three, four, five, or six is presented to the sensing members 62, no path is provided between the first and fourteenth circuit points and hence the pulsing relay P operates at the higher speed.

During the pulsing positions of the encoded drum 56, a path is provided between the first and second circuit points after the number of pulses corresponding to the encoded digit presented to the sensing members 62 is transmitted. Furthermore, when pulses are being transmitted a path is provided through the switching matrix 98 between the first and the fourteenth circuit points and therefore the pulsing relay P operates at the normal pulsing rate. But when no pulses are being transmitted, a path is not provided between the first and fourteenth circuit points and consequently the pulsing relay P operates at the higher speed.

When no digit is encoded in the row of discs 22 presented to the sensing members 62, during all sixteen positions of the encoded drum 56 a path is provided between the first and second circuit points, but no path is provided between the first and fourteenth circuit points. Consequently, throughout all sixteen positions of the encoded drum 56, no pulses are transmitted out on the telephone line, and the pulsing relay P operates at the higher speed.

After transmitting the last digit of a telephone number, the coding of the *s* or stop column results in the operation of the call transmitter being terminated and the telephone set 12 being once more connected across the telephone line. The subscriber then listens for the called party to answer. If the line is busy, the encoded card 20 is in position to be fully re-inserted into the entryway 16 to again call the party after a delay of a few minutes.

After the call is completed, the subscriber returns the handset 15 (FIG. 1) to the switchhook 14, thereby opening the normally open switchhook contacts SH, and depresses the release button 17 to release the card 20. The downward movement of the release button 17 causes the finger 82 of the release plunger 81 to laterally displace the release arm 84, thereby disengaging the escapement mechanism 40 and permitting the motor spring 36 to rotate the sprocket wheels 32 and 34 to move the card 20 out of the entryway 16.

As the card moves out of the entryway 16, it deflects in a clockwise direction those sensing members 62 extending into code holes 24 in the card 20. The code switch S is thereby actuated to close the normally closed contacts $S_1$ and open the normally open contacts $S_2$ thereof, and the pulsing relay P is connected across the telephone line, a path being provided from the top side of the line through the closed normally open sequence contacts $H_2$, the closed normally closed code contacts $S_1$, the coil 47 of the pulsing relay, and the closed normally closed pulsing contacts $P_1$ to the ring side of the telephone line. The pulsing relay P commences to operate and continues to operate until the encoded drum 56 returns to the home position whereupon the cam H' operates the sequence switch H to open the normally open contacts $H_2$ and thereby disconnects the pulsing relay from the telephone line.

The card 20 is moved to a threshold position in the entryway 16, at which point the sprocket wheels 32 and 34 are disengaged from the columns of sprocket holes 28 and 30 (FIG. 2) in the card, and the tab 85 (FIG. 3) of the sprocket wheel 34 moves the vane 86 of the detent 88 against the stop 90. The stop 90 arrests the vane 86 and the vane in turn arrests the rotation of the sprocket wheels 32 and 34. The movement of the vane 86 against the stop 90 moves the vane 92 into engagement with a shoulder on the start latch 45 and moves the latch to its forward position, thereby operating the dial start switch DS to close the normally closed contacts $DS_1$ and open the normally open contacts $DS_2$ thereof.

While the invention has been described in terms of a call transmitter for transmitting signals corresponding to the digits of a telephone number, it is not limited thereto. The invention may be employed in other types of communication systems and may be employed to transmit information other than that identifying a subscriber to the communication system. Thus the term "call transmitter" is intended to encompass code transmitters, and the term "digit" is intended to encompass any bit of information.

What is claimed is:

1. A call transmitter employing a code bearing medium having a plurality of digits encoded thereon, the call transmitter comprising:
  - a plurality of switches;
  - means associated with each of the switches for sensing the coding on the code bearing medium, the sensing means being normally spaced from the code bearing medium;
  - means associated with each sensing means for moving the sensing means toward the code bearing medium in a particular sensing sequence, each sensing means actuating its associated switch responsive to coding on the code bearing medium;
  - means under the control of the actuated switches for generating signals corresponding to the encoded digits and transmitting the signals out on a communication line; and
  - means under the control of the actuated switches for changing the speed at which the signal generating means operates.

2. A call transmitter employing a code bearing member having a plurality of digits encoded thereon, the call transmitter comprising:
  - a plurality of switches;
  - a plurality of members for sensing the coding on the code bearing member, each sensing member being associated with an individual switch and being biased toward a code bearing member by its associated switch;
  - means for normally maintaining the sensing members spaced from the code bearing member and permitting individual ones of the sensing members to move toward the code bearing member in a particular sensing sequence, the sensing members actuating their associated switches responsive to the coding on the code bearing member; and
  - means under the control of the actuated switches for generating signals corresponding to the encoded digits and transmitting the signals out on a communication line.

3. A call transmitter employing a code bearing member having a plurality of digits encoded thereon, the call transmitter comprising:

a plurality of movement controlling means;

a member for sensing the coding on the code bearing member associated with each movement controlling means, each sensing member extending into juxtaposition with the code bearing member and its associated movement controlling means;

a switch associated with each sensing member, each switch biasing its associated sensing member toward both the code bearing member and the movement controlling means associated therewith;

each movement controlling means including means for maintaining its associated sensing member spaced from the code bearing member, the sensing member when spaced from the code bearing member maintaining its associated switch in a normal condition, and each movement controlling means including means for permitting its associated sensing member to move toward the code bearing member, the sensing member actuating its associated switch responsive to the detection of coding on the code bearing member; and means under the control of the actuated switches for generating signals corresponding to the encoded digits and transmitting the signals out on a communication line.

4. A call transmitter as in claim 3 further including means under the control of the actuated switches for changing the speed at which the signal generating means operates.

5. A call transmitter employing a code bearing member having a plurality of digits identifying a subscriber to a communication system encoded thereon, the call transmitter comprising:

a plurality of switches;

a cam associated with each switch;

a member for sensing coding on the code bearing member associated with each switch and each cam, each sensing member being mounted intermediate its associated switch and its associated cam, each sensing member including a feeler portion that extends into juxtaposition with the code bearing member and a follower portion that extends into juxtaposition with its associated cam;

each switch biasing its associated operator toward both its associated cam and the code bearing member;

each cam including a nonoperating portion of large radius, the nonoperating portion maintaining the sensing member associated with the cam spaced from the code bearing member, and each cam including an operating portion of small radius, the operating portion permitting the associated switch to move the sensing member toward the code bearing member, the sensing member moving to a first position when no coding is detected thereby and moving to a second position when coding is detected thereby, the associated switch being actuated responsive to the movement of the sensing member to a second position; and means under the control of the actuated switches for generating signals corresponding to the encoded digits and transmitting the signals out on a telephone line.

6. A call transmitter employing a code bearing member having a plurality of digits identifying a subscriber to a telephone system encoded thereon, the call transmitter comprising:

a plurality of cams;

a switch associated with each cam, each switch being mounted intermediate the code bearing member and its associated cam;

a member for sensing the coding on the code bearing member associated with each switch and each cam, each sensing member being pivotally mounted intermediate its associated switch and associated cam, each sensing member including a feeler portion that extends into juxtaposition with the code bearing member and a follower portion that extends into juxtaposition with its associated cam;

each switch acting to rotate its associated sensing member into engagement with its associated cam and the code bearing member;

each cam including a nonoperating portion of large radius, the nonoperating portion engaging the follower portion of the associated sensing member and rotating the sensing member to space the follower portion thereof from the code bearing member, each cam further including an operating portion of small radius, the operating portion permitting the associated switch to rotate the follower portion of the sensing member toward the code bearing member, the sensing member moving to a first position when no coding is detected by the feeler portion thereof and moving to a second position when coding is detected by the feeler portion thereof, and the associated switch being actuated responsive to the movement of the sensing member to the second position; and means under the control of the actuated switches for generating signals corresponding to the encoded digits and transmitting the signals out on a telephone line.

7. A call transmitter comprising a code bearing medium having a plurality of digits encoded thereon, the call transmitter comprising:

a plurality of switches;

means associated with each of the switches for sensing the coding on the code bearing medium, the sensing means being normally spaced from the code bearing medium;

means associated with each sensing means for moving the sensing means toward the code bearing medium in a particular sensing sequence, each sensing means actuating its associated switch responsive to coding on the code bearing medium;

a switching matrix including the plurality of switches, the actuation of one of the switches at a particular point in the sensing sequence providing a path through the matrix that once provided is maintained through the remainder of the sensing sequence; and means for generating signals corresponding to the encoded digits and transmitting the signals out on a communication line when no path is provided through the switching matrix.

8. A call transmitter comprising a code bearing member having a plurality of digits identifying a subscriber to a communication system encoded thereon, the call transmitter comprising:

a plurality of switches;

a member associated with each switch for sensing the coding on the code bearing member, each sensing member being biased toward the code bearing member by its associated switch;

means for normally maintaining the sensing members spaced from the code bearing member and permitting the sensing members to move toward the code bearing member in a particular sensing sequence, the sensing members actuating their associated switches responsive to the coding on the code bearing member;

a switching matrix including the plurality of switches, the actuation of one of the switches at a particular point in the sensing sequence providing a path through the matrix that once provided is maintained through the remainder of the sensing sequence; and means for generating signals corresponding to the encoded digits and transmitting the signals out on a communication line when no path is provided through the switching matrix.

9. A call transmitter employing a code bearing member having a plurality of digits identifying a subscriber to a telephone system encoded thereon, the call transmitter comprising:

a plurality of switches A, B, C, D, E, F, G, H, I, and J, the switch A including normally closed contacts and the other switches including normally closed contacts and normally open contacts;

means associated with each of the switches A, B, and C for actuating the switches in a particular sensing sequence;

a member associated with each of the switches D, E, F, G, H, I, and J for sensing the coding on the code bearing member, each sensing member being biased toward the code bearing member by its associated switch;

means for normally maintaining the sensing members spaced from the code bearing member and permitting the sensing members to move toward the code bearing member in a particular sensing sequence, the sensing members actuating their associated switches responsive to the coding on the code bearing member;

a switching matrix including the switches A, B, C, D, E, F, G, H, I, and J, the switching matrix comprising a first circuit point connected to a second circuit point by the normally closed contacts of the switch A and connected to a third circuit point by the normally closed contacts of the switch D and connected to a fourth circuit point by the normally open contacts of the switch D, the third circuit point being connected to a fifth circuit point by the normally closed contacts of the switch E and being connected to a sixth circuit point by the normally open contacts of the switch E, the sixth circuit point being connected to the fourth circuit point by the normally closed contacts of the switch B, the fifth circuit point being connected to a seventh circuit point by the normally closed contacts of the switch F and being connected to an eighth circuit point by the normally open contacts of the switch F, the eighth circuit point being connected to the sixth circuit point by the normally closed contacts of the switch C, the seventh circuit point being connected to the second circuit point by the normally closed contacts of the switch G and being connected to a ninth circuit point by the normally open contacts of the switch G and being connected to a tenth circuit point by the normally closed contacts of the switch H, the tenth circuit point being connected to the ninth circuit point by the normally open contacts of the switch H, an eleventh circuit point being connected to the tenth circuit point by the normally closed contacts of the switch I and being connected to a twelfth circuit point by the normally open contacts of the switch I, a thirteenth circuit point being connected to the fourth circuit point and being connected to the eleventh circuit point by the normally closed contacts of the switch J and being connected to a fourteenth circuit point by the normally open contacts of the switch J, the fourteenth circuit point being connected to the twelfth circuit point, the sixth circuit point being connected by the normally open contacts of the switch B to a fifteenth circuit point intermediate and in series with the twelfth and fourteenth circuit points, the twelfth circuit point being connected to the ninth circuit point, and the eighth circuit point being connected by the normally open contacts of the switch C to a sixteenth circuit point intermediate and in series with the ninth and twelfth circuit point; and means for transmitting pulses out on a telephone line when no path is provided through the switching matrix.

10. A call transmitter as in claim 9 wherein means for transmitting pulses comprise a relay having a winding and normally closed contacts in series with the winding adapted to connect the winding across the telephone line whereby the relay is energized, the relay further having normally open contacts in series with the switching matrix adapted to connect the switching matrix across the telephone line, the relay when energized closing the normally open contacts whereby the switching matrix is connected across the telephone line and then opening the normally open contacts whereby the connection of the winding across the telephone line is interrupted and the relay is de-energized, the relay, when de-energized, closing the normally closed contacts whereby the connection of the winding across the telephone line is re-made and then opening the normally open contacts whereby the connection of the switching matrix across the telephone line is interrupted.

11. A call transmitter as in claim 10 further including a timing circuit in parallel with the winding of the relay, the timing circuit including a low speed section and a high speed section in series, the high speed section being connected in parallel with the first and fourteenth circuit points of the switching matrix, the high speed section controlling the speed of operation of the relay, but the high speed section being shorted responsive to the provision of a path between the first and fourteenth circuit points of the switching matrix whereby the low speed section controls the speed of operation of the relay.

References Cited by the Examiner

UNITED STATES PATENTS

| | | | |
|---|---|---|---|
| 2,813,931 | 11/1957 | De Forest | 179—90.1 |
| 3,078,349 | 2/1963 | Sasaki | 179—90.2 |
| 3,124,659 | 3/1964 | Andregg et al. | 179—90.2 |
| 3,129,295 | 4/1964 | Crommen | 179—90.2 |

KATHLEEN H. CLAFFY, *Primary Examiner.*

J. W. JOHNSON, H. ZELLER, *Assistant Examiners.*